Dec. 13, 1960   J. R. COBB, JR   2,964,385
STRIPPING HYDROGEN HALIDE FROM HYDROCARBONS
Filed Feb. 27, 1959
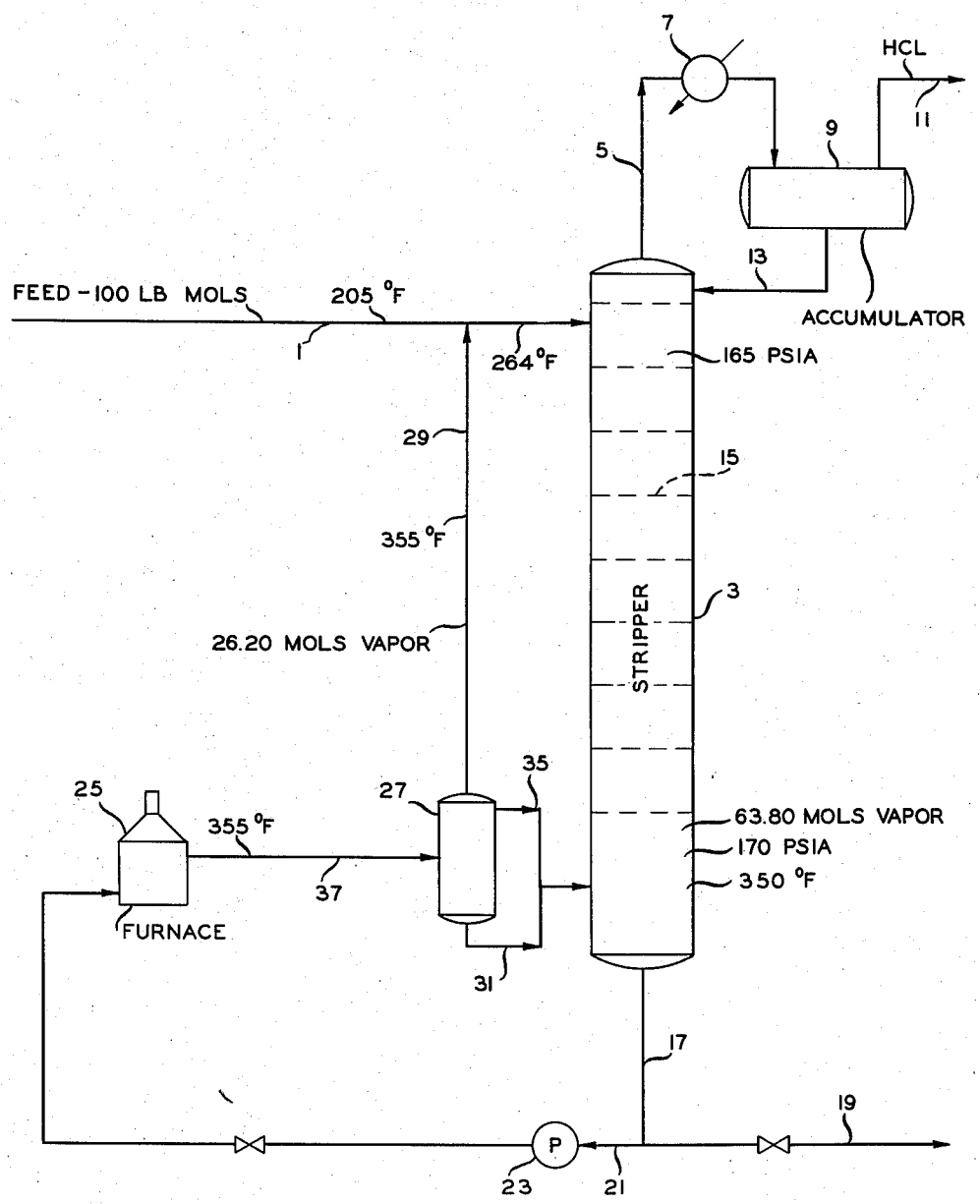
INVENTOR.
J. R. COBB, JR.
BY
ATTORNEYS United States Patent Office 2,964,385
Patented Dec. 13, 1960

2,964,385
STRIPPING HYDROGEN HALIDE FROM HYDROCARBONS

Joseph R. Cobb, Jr., Bartlesville, Okla., assignor to Phillips Petroleum Company, a corporation of Delaware Filed Feb. 27, 1959, Ser. No. 796,144

7 Claims. (Cl. 23—154)

This invention relates to operation of a hydrogen halide stripper. In one aspect it relates to operation of a stripper for removal of hydrogen chloride, or of hydrogen fluoride, for example, from a hydrocarbon isomerizate containing dissolved hydrogen chloride or hydrogen fluoride and produced in the isomerization of normal hexane in the presence of aluminum chloride or hydrogen fluoride as a catalyst.

The process of this invention will be described employing an isomerizate produced in the isomerization of n-hexane employing aluminum chloride as a catalyst, and containing dissolved hydrogen chloride.

The isomerizate feed to a hydrogen chloride stripper is not ordinarily available at a temperature sufficiently high for efficient stripping of the hydrogen chloride. The feed must be heated in some manner.

In conventional stripping of hydrogen chloride from such an isomerizate feed stock containing hydrogen chloride, when the feed is heated in the stripping column by upflowing hot vapors, excessively large amounts of reboiler vapor are required. As is known in the stripping art, column capacity is regulated by the vapor load in the kettle section of the column. Thus, large vapor requirements for heating the liquid in the column and for stripping add up to a large vapor load in the kettle and, therefore, the column has a small liquid capacity. A steam exchanger preheating the feed cannot be used because of danger of leakage of steam (water) into the feed and, conversely, leakage of the feed stream containing hydrogen chloride into the steam. The presence of water in a feed containing hydrogen chloride is obviously to be avoided because of the corrosive nature of hydrochloric acid. Conventional steel piping and stripping column are preferred over acid resistant material because of the cost factor. The presence of hydrogen chloride in the steam, after condensation, corrodes water return pipes and boiler tubes.

Prior art has, however, employed a heat exchanger for heat exchanging hot kettle product from the stripper column with the feed thereto, but it was found that heat exchanger fouling was excessive. The fouling of the heat exchanger involved formation and deposition of organic chloride containing material on the exchanger tubes. This deposited material markedly reduced the heat exchange efficiency of the exchanger. Because of the progressively reduced efficiency the exchanger had to be cleaned at least each week, thereby causing not only labor expense for the actual cleaning operation but causing the shutdown of the stripper and loss of operating time.

An object of this invention is to provide an improved method for operating a hydrogen chloride stripper. Another object of this invention is to provide a method for operating a hydrogen chloride stripper wherein the liquid capacity of a given size stripper can be increased or a stripper of another size can treat the throughput normally requiring a larger size stripper. Another object of this invention is to provide a method for operating a hydrogen chloride stripper wherein the vapor load requirements of the stripper are reduced. Yet another object of this invention is to provide a method for operating such a stripper wherein heat exchanger cleaning is not required and the on-stream time of the stripper is increased. Other objects and advantages of this invention will be realized upon reading the following description which, taken with the attached drawing, forms a part of this specification.

Normally in the stripping of hydrogen chloride from a hexane isomerizate, vapor produced in the kettle passes upward a few trays, is condensed by downflowing liquid and returned therewith to the kettle, only to be revaporized for another trip up the column. To heat the downflowing liquid, reboiler vapor makes many trips to and from the reboiler. In this manner the vapor load in the reboiler or kettle section of the column is large.

I have found that upon passing a portion of the kettle vapor directly into the feedstock, as a preheating means, the heating requirements below the feed tray are much reduced and the vapor load in the kettle is accordingly reduced. The liquid load on the column can also be increased, if desired, to a rate which would cause flooding when operating in the above-mentioned normal manner.

The drawing illustrates a preferred arrangement of apparatus parts for carrying out the process of this invention.

In the drawing, an isomerizate from a hexane isomerization operation is passed from a source, not shown, through a pipe 1 into the upper portion of a stripping column 3. This column is provided with conventional vapor-liquid contact promoting packing apparatus such as bubble cap trays or plates 15. A pipe 5 provides for withdrawal of overhead vapors from the column. A condenser 7 is provided for condensing a portion of the overhead vaporous material to serve as reflux. Effluent from condenser 7 is passed into an accumulator 9. Uncondensed vaporous material is withdrawn from the accumulator by way of a pipe 11 while condensate is passed through pipe 13 and introduced into the top of the column as reflux.

Bottoms or kettle material is withdrawn from the column through a pipe 17 and is divided into two portions. One portion is withdrawn from the system through a pipe 19 for such disposal as desired. The other portion is passed through a pipe 21 containing a pump 23 which pressures this portion of bottoms material through a fired furnace 25 which heats the liquid. The heated liquid is passed on through a pipe 37 into a vessel 27 in which flash vaporization takes place. Liquid is withdrawn from the bottom of this vessel through a pipe 31 and is passed into the kettle section of the stripper for reboiling purposes. A portion of the vapor phase separated in vessel 27 is passed through a pipe 29 and is added directly to the feed material in pipe 1 for preheating the feed. The remainder of the vapor separated in vessel 27 is passed through a pipe 35 and is recombined with liquid in pipe 31 for passage into the kettle.

As an example of an operation according to this process, an isomerizate produced in the aluminum chloride catalyzed isomerization of normal hexane is charged as feedstock to the stripper. Such an isomerizate produced in the presence of aluminum chloride always contains some hydrogen chloride in solution and obviously this hydrogen chloride must be removed. In the example given below, I pass 26.20 pound mols of vapor at about 355° F. from the flash vessel 27 through pipe 29 for directly heating the feed in pipe 1. When charging 100 pound mols of isomerizate per hour, it is thus heated from about 205° F. to about 264° F. by this vapor and, accordingly, that much heating of the feed is done outside the column in place of being carried out by the stripping vapors in the column. In this example 90 pound mols of vapor were flashed from the liquid at about 355° F. in flash vessel 27. Upon passage of 26.20 mols of vapor into the feed, only 63.80 mols of vapor were passed into the kettle of the stripper for final heating and stripping of the downflowing liquid. Thus, the vapor load on the column was decreased from 90 to 63.8 pound mols per hour. The liquid capacity of the column could be increased, if desired, in proportion to the reduction of the vapor requirements of the column. Thus, if a column had a sufficient diameter to handle 90 pound mols per hour of upflowing vapor and the feed to the column were heated to a temperature of 264° F., the liquid charged to the column could be increased from 100 pound mols to about 140 pound mols per hour. Conversely, when 26.20 mols of vapor bypass the column leaving only 63.8 mols for column use, a column of smaller diameter and of less cost could be employed than when 90 mols of vapor are utilized in the column.

The following tabulation is a material balance of a hydrogen chloride stripper operating on such an isomerizate as mentioned and in the manner of this invention. Operating conditions are listed, as well as stream compositions which are given in pound mols per hour.

*Material balance on hexane isomerization stripper*

| Stream or Vessel No. Component | (1) Feed | (11) Vaporous Overhead | (19) Bottoms | (29) Vapor to Heat Feed | (21) Feed to Furnace | (31, 27) Separator Liquid | (27) Separator Vapor |
|---|---|---|---|---|---|---|---|
| Propane | 0.41 | 0.39 | 0.02 | 0.02 | 0.11 | 0.05 | 0.06 |
| 2,2-dimethylbutane | 8.11 | 0.11 | 8.00 | 2.86 | 43.30 | 33.54 | 9.76 |
| HCl | 6.10 | 6.10 | $2\times10^{-6}$ | $2\times10^{-6}$ | $1\times10^{-5}$ | $2\times10^{-6}$ | $8\times10^{-6}$ |
| $C_1$ | 0.16 | 0.16 | | | | | |
| $C_2$ | 0.08 | 0.08 | | | | | |
| $iC_4$ | 0.01 | 0.001 | 0.009 | | 0.05 | 0.03 | 0.02 |
| $nC_4$ | 0.01 | 0.001 | 0.009 | | 0.05 | 0.03 | 0.02 |
| $nC_5$ | 0.01 | | 0.01 | | 0.05 | 0.03 | 0.02 |
| 2,3-dimethylbutane | 6.06 | 0.06 | 6.00 | 2.20 | 32.40 | 26.43 | 7.50 |
| 2-methylpentane | 17.87 | 0.16 | 17.71 | 5.46 | 95.90 | 77.22 | 18.68 |
| 3-methylpentane | 8.82 | 0.07 | 8.75 | 2.54 | 47.30 | 38.60 | 8.70 |
| $nC_6$ | 20.34 | 0 14 | 20.20 | 5.63 | 109.10 | 89.85 | 19.25 |
| Methylcyclopentane | 7.00 | 0.05 | 6.95 | 1.84 | 37.60 | 31.30 | 6.30 |
| Cyclohexane | 24.00 | 0.11 | 23.89 | 5.47 | 129.20 | 110.50 | 18.70 |
| 1,1-dimethylcyclopentane | 1.02 | | 1.02 | 0.18 | 5.51 | 4.89 | 0.62 |
| Total, pound mols | 100.00 | 7.43 | 92.57 | 26.20 | 500.57 | 410.94 | 89.63 |
| Temperature, °F | 205 | | 350 | 355 | 350 | 355 | 355 |
| Pressure, p.s.i.a. | | 165 | 170 | | | | |

Temperature of feed stream prior to contact with hot flash vapors about 205° F.

The kettle portion may be maintained, obviously at other temperatures than that given hereinabove, for example, from about 300° to about 400° F. Pressures are adjusted according to the particular feedstock and temperature selected. The furnace is operated so as to heat the kettle material for provision of suitable reboiling in the column and to produce sufficient flash vapors in vessel 27 for suitably directly preheating the feedstock prior to its introduction into the stripper.

Increased liquid capacity of a stripper column and/or reduced vapor load when using the process of my invention have been hereinabove mentioned. Another advantage is that by not using one or more liquid-liquid heat exchangers in which stripper kettle product is heat exchanged with the feed, cost of labor for cleaning exchangers is not involved. Also, the stripper need not be closed down for exchanger cleaning.

While I have described the stripping of an isomerizate produced in the isomerization of normal hexane, this method is applicable to treatment of other normally liquid feedstocks containing hydrogen chloride or hydrogen fluoride as, for example, an isomerizate produced in the isomerization of normal butane, or normal pentane, with aluminum chloride or hydrofluoric acid as catalyst. Furthermore, other hydrocarbon feedstocks containing hydrogen chloride or hydrogen fluoride can be advantageously stripped of their hydrogen chloride or hydrogen fluoride content by the process of this invention. Obviously those skilled in the art will realize that operating pressures and temperatures will need be adjusted in accordance with the feedstock being treated.

While certain embodiments of the invention have been described for illustrative purposes, the invention obviously is not limited thereto.

I claim:

1. A method for stripping a hydrogen halide from a feedstock comprising a normally liquid hydrocarbon containing said hydrogen halide in solution, comprising heating said feedstock by combining therewith a hot vapor as subsequently produced, introducing the combined and heated feed material into the upper portion of a stripping zone maintained under stripping conditions, withdrawing overhead vaporous material from a level of said zone above the level of feed introduction, withdrawing kettle material from the kettle portion of said zone, dividing the withdrawn kettle material into two portions, heating one portion in a fired heating zone to a temperature higher than the desired kettle temperature, separating the heated portion into a hot vapor phase and a hot liquid phase, said hot vapor phase being the aforesaid hot vapor as subsequently produced, introducing the hot liquid phase into the kettle portion of said stripping zone thereby providing reboiling heat thereto, and removing the other portion of kettle material and the vaporous overhead material as products of the operation.

2. A method for stripping hydrogen chloride from a feedstock comprising a normally liquid hydrocarbon containing hydrogen chloride in solution, comprising heating said feedstock by combining therewith a hot vapor as subsequently produced, introducing the combined and heated feed material into the upper portion of a stripping zone maintained under stripping conditions, withdrawing overhead vaporous material from a level of said zone above the level of feed introduction, withdrawing kettle material from the kettle portion of said zone, dividing the withdrawn kettle material into two portions, heating one portion in a fired heating zone to a temperature higher than the desired kettle temperature, separating the heated portion into a hot vapor phase and a hot liquid phase, said hot vapor phase being the aforesaid hot vapor as subsequently produced, introducing the hot liquid phase into the kettle portion of said stripping zone thereby providing reboiling heat thereto, and removing the other portion of kettle material and the vaporous overhead material as products of the operation.

3. In the method of claim 2, wherein said feedstock comprises an isomerizate produced in the isomerization of n-hexane in the presence of catalytic aluminum chloride.

4. In the method of claim 3, maintaining the material in the kettle portion of said stripping zone at a temperature of about 350° F.

5. In the method of claim 3, wherein the two portions of withdrawn kettle material are of approximately equal volumes.

6. In the method of claim 3, condensing a portion of the withdrawn overhead vaporous material, separating condensate from uncondensed material, returning the condensate to the stripping zone as reflux and withdrawing the uncondensed material as the product hydrogen chloride of the operation.

7. In the method according to claim 3, maintaining the material in the kettle portion of said stripping zone at a temperature in the range of about 300° to 400° F.

References Cited in the file of this patent

UNITED STATES PATENTS

| | | |
|---|---|---|
| 2,116,772 | Tucker et al. | May 10, 1938 |
| 2,537,076 | McCaulay et al. | Jan. 9, 1951 |